(12) United States Patent
Onuma et al.

(10) Patent No.: US 11,192,242 B2
(45) Date of Patent: Dec. 7, 2021

(54) HOLDING APPARATUS, CONTAINER PROVIDED WITH TAG, OBJECT HOLDING PROGRAM AND OBJECT HOLDING METHOD

(71) Applicants: TOYOTA JIDOSHA KABUSHIKI KAISHA, Toyota (JP); NATIONAL INSTITUTE OF INFORMATION AND COMMUNICATIONS TECHNOLOGY, Koganei (JP)

(72) Inventors: Yuji Onuma, Nagakute (JP); Komei Sugiura, Koganei (JP)

(73) Assignees: TOYOTA JIDOSHA KABUSHIKI KAISHA, Toyota (JP); NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 214 days.

(21) Appl. No.: 16/408,560

(22) Filed: May 10, 2019

(65) Prior Publication Data

US 2019/0351547 A1   Nov. 21, 2019

(30) Foreign Application Priority Data

May 18, 2018   (JP) .............................. JP2018-096213

(51) Int. Cl.
| | | |
|---|---|---|
| *B25J 9/16* | (2006.01) | |
| *B25J 13/02* | (2006.01) | |
| *B25J 13/08* | (2006.01) | |
| *G06K 7/14* | (2006.01) | |

(52) U.S. Cl.
CPC ............ *B25J 9/1612* (2013.01); *B25J 9/1697* (2013.01); *B25J 13/02* (2013.01); *B25J 13/08* (2013.01); *G06K 7/1417* (2013.01)

(58) Field of Classification Search
USPC .................................................. 700/245–264
See application file for complete search history.

(56) References Cited

U.S. PATENT DOCUMENTS

| | | | |
|---|---|---|---|
| 5,501,571 A | 3/1996 | Van Durrett et al. | |
| 6,036,812 A * | 3/2000 | Williams ................ | B65G 1/045 156/277 |
| 8,035,687 B2 * | 10/2011 | Nishiyama ........... | G06K 9/6288 348/169 |
| 8,175,748 B2 * | 5/2012 | Matsumoto .......... | G05D 1/0251 700/253 |
| 8,260,463 B2 * | 9/2012 | Nakamoto ........... | B25J 15/0009 700/259 |

(Continued)

FOREIGN PATENT DOCUMENTS

| | | |
|---|---|---|
| EP | 2 581 747 A2 | 4/2013 |
| JP | 2007-216381 A | 8/2007 |

(Continued)

*Primary Examiner* — Jonathan L Sample
(74) *Attorney, Agent, or Firm* — Oliff PLC

(57) ABSTRACT

A holding apparatus includes a first detection unit configured to detect an indicated holding object, a second detection unit configured to detect, when the first detection unit detects the holding object, a tag proximate to the holding object, and a holding part configured to hold a container provided with the tag based on tag information of the tag detected by the second detection unit.

7 Claims, 8 Drawing Sheets

(56) References Cited

U.S. PATENT DOCUMENTS

| | | | |
|---|---|---|---|
| 8,639,644 B1 * | 1/2014 | Hickman | G06N 3/008 706/14 |
| 8,918,208 B1 * | 12/2014 | Hickman | B25J 9/1602 700/253 |
| 9,102,055 B1 * | 8/2015 | Konolige | G06T 7/13 |
| 9,120,622 B1 * | 9/2015 | Elazary | B25J 15/0608 |
| 9,333,649 B1 * | 5/2016 | Bradski | G06T 7/529 |
| 9,418,421 B1 | 8/2016 | Neishaboor et al. | |
| 9,424,470 B1 * | 8/2016 | Hinterstoisser | B25J 9/0093 |
| 9,575,492 B1 * | 2/2017 | Theobald | B25J 5/005 |
| 9,665,095 B1 * | 5/2017 | Romano | G05D 1/0246 |
| 9,720,414 B1 * | 8/2017 | Theobald | B25J 11/008 |
| 10,007,827 B2 * | 6/2018 | Wagner | G06K 9/00201 |
| 10,265,872 B2 * | 4/2019 | Wagner | B25J 19/06 |
| 10,482,550 B1 * | 11/2019 | Theobald | B25J 11/008 |
| 10,646,993 B1 * | 5/2020 | Wiley | B25J 9/042 |
| 10,649,445 B2 * | 5/2020 | Wagner | B65G 1/1373 |
| 10,803,420 B2 * | 10/2020 | Jarvis | G05D 1/0297 |
| 2001/0056313 A1 * | 12/2001 | Osborne, Jr. | B25J 13/003 700/245 |
| 2003/0156493 A1 * | 8/2003 | Bayer | G05D 1/0261 367/6 |
| 2006/0111811 A1 * | 5/2006 | Okamoto | B25J 9/0003 700/214 |
| 2006/0195226 A1 * | 8/2006 | Matsukawa | B25J 9/162 700/245 |
| 2007/0013510 A1 * | 1/2007 | Yamada | G01S 13/74 340/539.1 |
| 2007/0124024 A1 * | 5/2007 | Okamoto | B25J 9/0003 700/245 |
| 2007/0135962 A1 * | 6/2007 | Kawabe | G10L 13/00 700/225 |
| 2007/0239315 A1 * | 10/2007 | Sato | B25J 9/1612 700/245 |
| 2008/0249663 A1 * | 10/2008 | Aoyama | G06K 7/14 700/259 |
| 2009/0105880 A1 * | 4/2009 | Okazaki | B25J 9/1633 700/258 |
| 2012/0053724 A1 * | 3/2012 | Okamoto | B25J 9/1682 700/114 |
| 2012/0165979 A1 * | 6/2012 | Lim | B25J 9/162 700/253 |
| 2013/0030570 A1 * | 1/2013 | Shimizu | G05D 1/0246 700/259 |
| 2014/0163731 A1 * | 6/2014 | Shi | B25J 9/1669 700/250 |
| 2014/0222191 A1 * | 8/2014 | Blumenau | B65G 1/137 700/218 |
| 2015/0224650 A1 * | 8/2015 | Xu | B25J 9/1697 700/213 |
| 2015/0238978 A1 | 8/2015 | Muller et al. | |
| 2015/0274421 A1 * | 10/2015 | Yamada | B25J 11/008 700/218 |
| 2016/0279809 A1 * | 9/2016 | Nakajima | G06K 9/00664 |
| 2017/0011580 A1 * | 1/2017 | Huang | G06Q 30/0601 |
| 2017/0097232 A1 * | 4/2017 | Anderson-Sprecher | B25J 5/007 |
| 2017/0109856 A1 * | 4/2017 | Inazumi | B25J 9/1697 |
| 2017/0121113 A1 | 5/2017 | Wagner et al. | |
| 2017/0136632 A1 * | 5/2017 | Wagner | B25J 9/1612 |
| 2017/0154397 A1 | 6/2017 | Satou | |
| 2017/0173796 A1 | 6/2017 | Kim et al. | |
| 2017/0174431 A1 * | 6/2017 | Borders | B65G 1/0421 |
| 2017/0252924 A1 * | 9/2017 | Vijayanarasimhan | G06N 3/084 |
| 2017/0322561 A1 * | 11/2017 | Stiernagle | B65G 1/04 |
| 2018/0029797 A1 * | 2/2018 | Hance | B25J 19/023 |
| 2018/0072523 A1 * | 3/2018 | Peters | B25J 15/0213 |
| 2018/0150661 A1 * | 5/2018 | Hall | B25J 11/008 |
| 2018/0273296 A1 * | 9/2018 | Wagner | B65G 1/1378 |
| 2018/0282079 A1 * | 10/2018 | Heath | B25J 9/1669 |
| 2019/0050670 A1 * | 2/2019 | Pogorelik | G06K 7/1413 |
| 2019/0176346 A1 * | 6/2019 | Ma | B25J 15/0014 |
| 2019/0217471 A1 * | 7/2019 | Romano | B25J 15/0019 |
| 2019/0243358 A1 * | 8/2019 | Jaquez | G05D 1/0238 |
| 2020/0030978 A1 * | 1/2020 | Diankov | B25J 9/1666 |

FOREIGN PATENT DOCUMENTS

| | | |
|---|---|---|
| JP | 3996598 B2 | 10/2007 |
| JP | 4646943 B2 | 3/2011 |
| JP | 4802784 B2 | 10/2011 |
| JP | 2015-182211 A | 10/2015 |
| JP | 6031368 B2 | 11/2016 |
| JP | 6117901 B1 | 4/2017 |
| WO | 2016/077042 A1 | 5/2016 |
| WO | 2016/167886 A1 | 10/2016 |

* cited by examiner

HOLDING APPARATUS, CONTAINER PROVIDED WITH TAG, OBJECT HOLDING PROGRAM AND OBJECT HOLDING METHOD

CROSS REFERENCE TO RELATED APPLICATIONS

This application is based upon and claims the benefit of priority from Japanese patent application No. 2018-96213, filed on May 18, 2018, the disclosure of which is incorporated herein in its entirety by reference.

BACKGROUND

The present disclosure relates to a holding apparatus, a container provided a tag, an object holding program, and an object holding method.

Techniques for holding an object with a robot hand have been widely put into practical use. A holding apparatus that can hold even an object which is difficult to be held by performing a learning work for the object is also known (e.g., see Japanese Unexamined Patent Application Publication No. 2007-216381).

SUMMARY

When an object to be held by a holding apparatus is small or has a complicated shape, it is difficult to hold it directly. It may not be possible to hold a target object in the first place due to structural limitations of a hand part of the holding apparatus. When the object is contained in a transparent container, the holding apparatus can recognize the object but cannot recognize the container which contains the object, thereby consequently leading to a failure to hold the object in some cases.

The present disclosure provides a holding apparatus capable of holding an object indirectly when the object to be held is indicated.

A first example aspect of the present disclosure is a holding apparatus including: a first detection unit configured to detect an indicated holding object; a second detection unit configured to detect, when the first detection unit detects the holding object, a tag proximate to the holding object; and a holding part configured to hold a container provided with the tag based on tag information of the tag detected by the second detection unit.

When the holding object is contained in the container provided with the tag, and when the information about the container and the information related to the holding are embedded in the tag, the holding apparatus can indirectly hold the object by holding the container even if the holding part cannot structurally hold the object directly. Further, a user can directly specify the holding object which he/she wants the holding apparatus to hold instead of specifying the container to be held at the stage of instructing the holding apparatus to perform the holding, which eliminates the need for the user to concern about the container which contains the holding object. Further, when the container can be recognized in advance from the tag information, the holding apparatus does not attempt to directly hold the holding object even when the container is transparent and an outer shape thereof cannot be accurately detected. Moreover, the user does not need to perform an operation to associate the container with the holding object in advance, and the holding apparatus can indirectly hold any holding object as long as it can be contained in the container and can be detected by the first detection unit. It is obvious that the holding apparatus does not need to perform learning work and the like in advance.

In particular, when the tag information includes at least one of the shape information of the container and the holding position information of the container, the holding apparatus can easily determine how to hold the container, which enables a holding operation to be quickly and efficiently executed. Further, when the tag is a marker of a two-dimensional code, and when the holding part is configured to hold the container based on the tag information and a position of the marker, one camera can be used as the first detection unit and the second detection unit. In this case, it is not necessary to embed much information in the tag information because only the information about how to hold the container with respect to the position of the marker has to be embedded in the tag information, and thus the tag with a simple two-dimensional code can be achieved.

In the above holding apparatus, when the indicated holding object is not included in a predetermined holding object group, the holding part may hold the indicated holding object without the tag being detected by the second detection unit. When the object to be contained in the container and indirectly held is predetermined, it is possible to avoid trouble in detecting the tag when another holding object is indicated. Further, when the object can be directly held, the holding object can be more stably held.

A second example aspect of the present disclosure is a container provided with the above tag and formed of a translucent material to be held by the above holding apparatus. A contained object contained in the container formed of the translucent material can be observed by a camera from the outside, and thus the holding apparatus can indirectly hold the holding object even when the indicated holding object is surrounded by the container. Moreover, the shape of the container may be deep bottom or a covered container as long as a material thereof is translucent, and thus it is possible to more stably hold the holding object. Furthermore, the user only needs to put the object to be held by the holding apparatus in such a container and place it on, for example, a shelf, which achieves easily management of the object and eliminates the need for troublesome preparation work.

A third example aspect of the present disclosure is an object holding program causing a computer to execute: controlling a first detection unit to detect an indicated holding object; controlling a second detection unit to detect, when the holding object is detected in the controlling of the first detection unit, a tag proximate to the holding object; and controlling a holding part to hold a container provided with the tag based on tag information of the tag detected in the controlling of the second detection unit.

A fourth example aspect of the present disclosure is a target holding method including: putting a holding object in a container provided with a tag and formed of a translucent material; indicating a holding object; and controlling a holding apparatus to hold the container containing the holding object indicated in the indicating. The controlling includes: controlling a first detection unit to detect the holding object indicated in the indicating; controlling a second detection unit to detect, when the holding object is detected in the controlling of the first detection unit, the tag proximate to the holding object; and controlling a holding part to hold a container provided with the tag based on tag information of the tag detected in the controlling of the second detection unit. The third and fourth example aspects can achieve the same effect as that achieved by the first example aspect.

According to the present disclosure, it is possible to provide a holding apparatus capable of holding an object indirectly when an object to be held is indicated.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
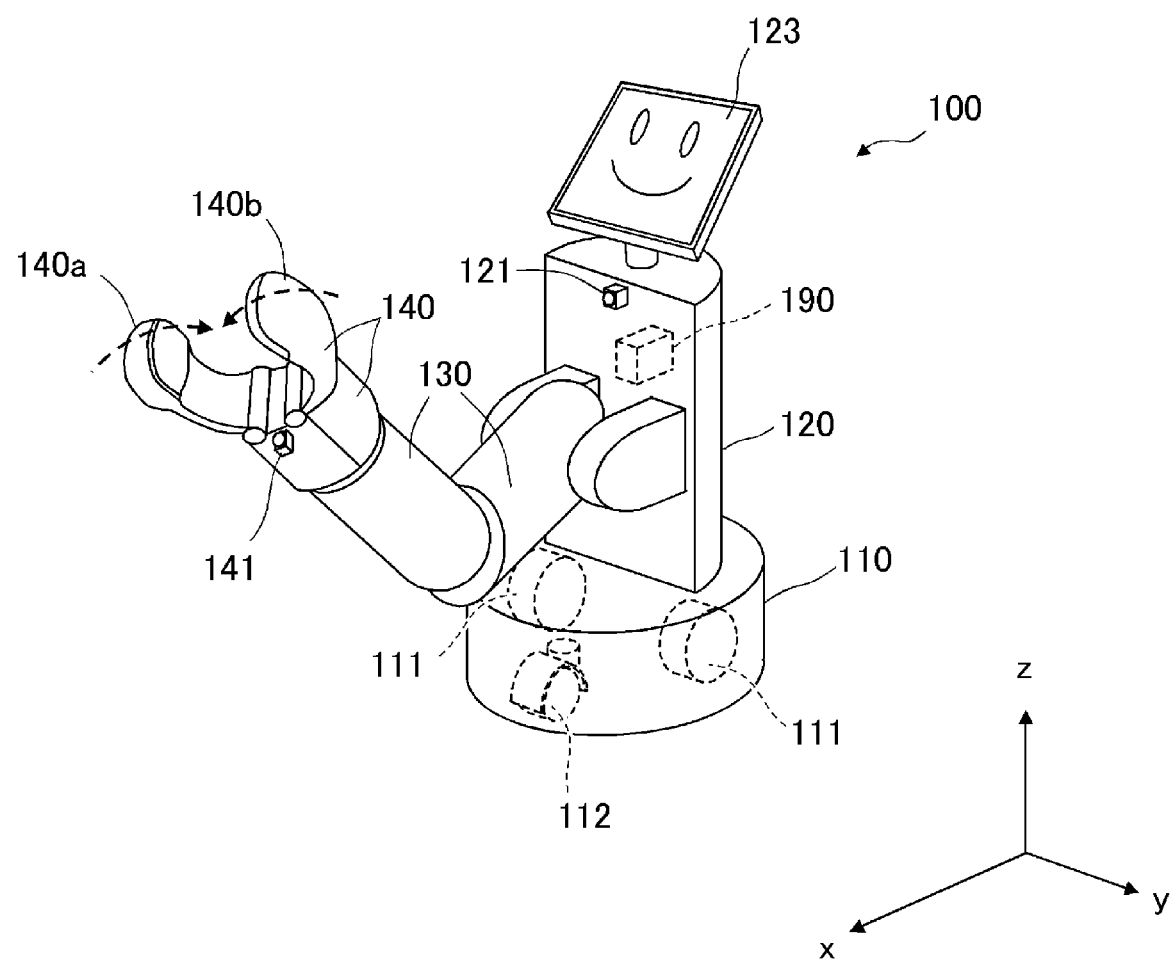
FIG. 1 is an external perspective view of a moving robot including a holding apparatus.

FIG. 1 is an external perspective view of a moving robot 100 including a holding apparatus according to this embodiment. In the drawing, an xy plane is a traveling plane of the moving robot 100, and a z-axis positive direction is a vertical direction. The moving robot 100 is mainly composed of a cart part 110, a main body part 120, an arm unit 130, and a hand unit 140. The arm unit 130 and the hand unit 140 constitute the holding apparatus.

The cart part 110 supports two driving wheels 111 and one caster 112, each of which is grounded on a traveling surface, in a cylindrical housing. The two driving wheels 111 are arranged so that rotational axes thereof coincide. Each of the driving wheels 111 is rotated independently by a motor (not shown). The caster 112 is a trailing wheel. The caster 112 is disposed in such a way that a pivot shaft extending from the cart part 110 in the vertical direction pivotally supports the wheel away from a rotation axis of the wheel. The caster 112 follows the cart part 110 in a direction in which the cart part 110 moves. For example, the moving robot 100 moves straight if the two driving wheels 111 are rotated at the same rotation speed in the same direction, while it turns around a vertical axis passing through a center of the two driving wheels 111 of the cart part 110 if the two driving wheels 111 are rotated at the same rotation speed in the directions opposite to each other.

The main body part 120 supports the arm unit 130 and includes a display panel 123 which constitutes a part of a user interface. The display panel 123 is, for example, a liquid crystal panel, and displays a face of a character and presents information about the moving robot 100. The display panel 123 includes a touch panel on its display surface, and can accept instructions input from a user.

The main body part 120 includes an environment camera 121 at a position overlooking a front environmental space including an operation range of the arm unit 130 and the hand unit 140. The environment camera 121 includes, for example, an image pickup element, which is a CMOS image sensor, and an image data generation unit. The environment camera 121 outputs image data generated by photographing the front environment space. The main body part 120 includes a control unit 190. The control unit 190 includes a controller, a memory, etc., which will be described later.

The arm unit 130 supported by the main body part 120 is an example of an arm part, and includes, for example, two links as shown in the drawing. The arm unit 130 can be in various postures by driving motors (not shown) provided at the respective base ends of the links. The hand unit 140 is connected to a distal end part of the arm unit 130. The entire hand unit 140 can turn by a motor (not shown) around a turn axis that is parallel to a direction in which the distal links of the arm unit 130 extend. The hand unit 140 is an example of a holding part, and includes a first finger 140a and a second finger 140b that are driven by a motor (not shown) at a distal end part thereof. The first finger 140a and the second finger 140b operate to approach each other as indicated by dotted arrows and achieve holding of an object by sandwiching the object.

A hand camera 141 is disposed at a support base part of the first finger 140a and the second finger 140b of the hand unit 140. The hand camera 141 includes, for example, an image pickup element, which is a CMOS image sensor, and an image data generation unit. The hand camera 141 outputs image data generated by photographing a front space of the hand unit 140. The hand camera 141 functions as a first detection unit that detects an indicated holding object. The hand camera 141 also has a function as a second detection unit that detects a marker as a tag proximate to the holding object.

Figure 2:
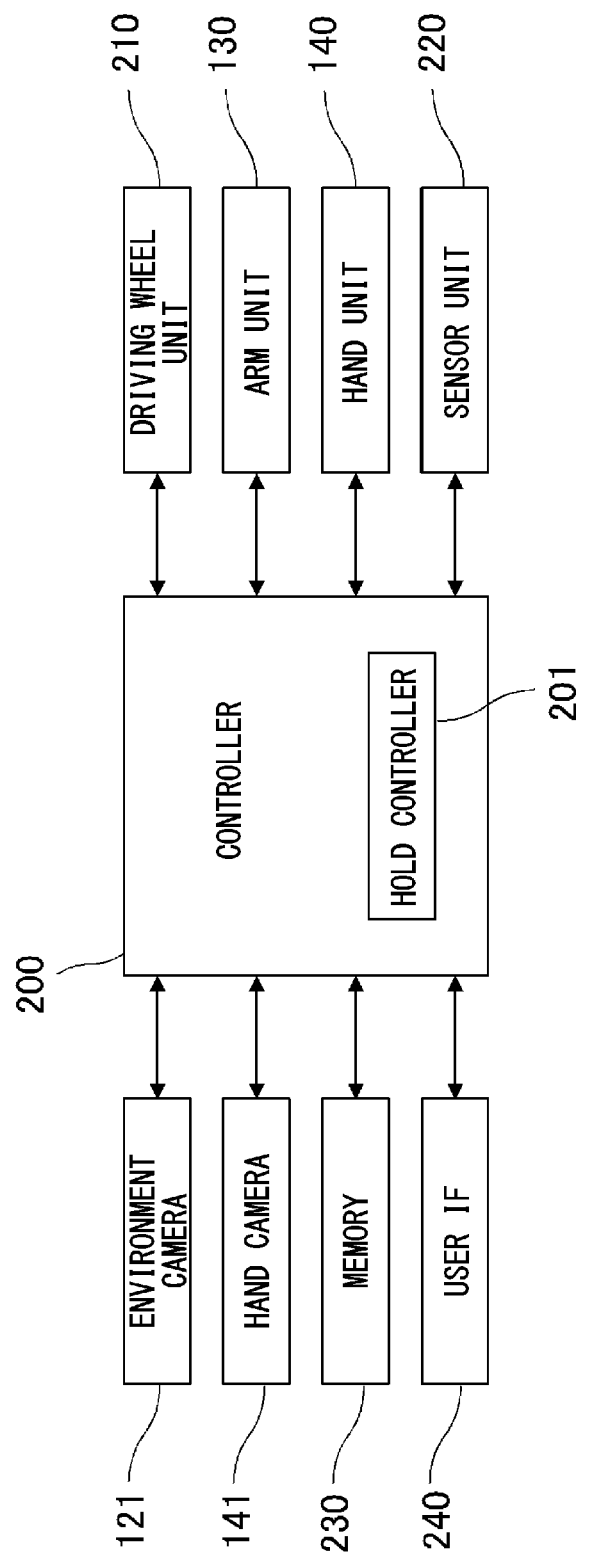
FIG. 2 is a control block diagram of a moving robot.

FIG. 2 is a control block diagram of the moving robot 100. The controller 200 is, for example, a CPU, and is stored in the control unit 190 of the main body part 120. A driving wheel unit 210 includes a driving circuit and a motor for driving the driving wheels 111, and is provided in the cart part 110. The controller 200 sends a driving signal to the driving wheel unit 210 to thereby control the rotations of the driving wheels 111.

The arm unit 130 further includes an encoder and so on for monitoring the driving circuit for driving the motor and an amount of operation in addition to the structure described with reference to FIG. 1. The controller 200 sends a driving signal to the arm unit 130 to thereby control the movement and posture of the arm. The hand unit 140 further includes a driving circuit for driving the motor, an encoder for monitoring the amount of operation, and so on in addition to the structure described with reference to FIG. 1. The controller 200 sends a driving signal to the hand unit 140 to thereby control operations and postures of the hand.

A sensor unit 220 includes various sensors for detecting an obstacle during movement and detecting contact from the outside. The sensors are disposed in the cart part 110 and the main body part 120 in a distributed manner. The controller 200 sends a control signal to the sensor unit 220 to thereby drive the various sensors and obtains outputs of the sensors.

As described above, the environment camera 121 is used to observe the front environmental space including the operation range of the arm unit 130 and the hand unit 140, and photographs images according to a photographing instruction from the controller 200. The environment camera 121 passes generated image data to the controller 200. As described above, the hand camera 141 is used to observe the space in front of the hand unit 140 and photographs images according to a photographing instruction from the controller 200. The hand camera 141 passes the generated image data to the controller 200.

The memory 240 is a non-volatile storage medium, and is, for example, a solid state drive. The memory 240 stores not only a robot control program for controlling the moving robot 100 but also various parameter values, functions, lookup tables, and so on used for the control. The robot control program includes an object holding program for controlling the arm unit 130 and the hand unit 140 which constitute the holding apparatus.

A user IF 240 is, for example, the display panel 123 and a speaker or the like that utters a synthesized voice, and includes an output apparatus that provides information to the user in accordance with the control by the controller 200. The user IF 240 also includes an input apparatus such as a touch panel provided on a display surface of the display panel 123 for accepting an instruction input from the user and sending an input signal to the controller 200.

The controller 200 also functions as a function calculation unit that executes various calculations related to control. The hold controller 201 controls the holding operation for holding the object. The hold controller 201 performs various calculations, which will be described later, and sends a driving signal to the hand unit 140 in order to execute the holding operation of the hand unit 140 based on the calculation result.

Figure 3:
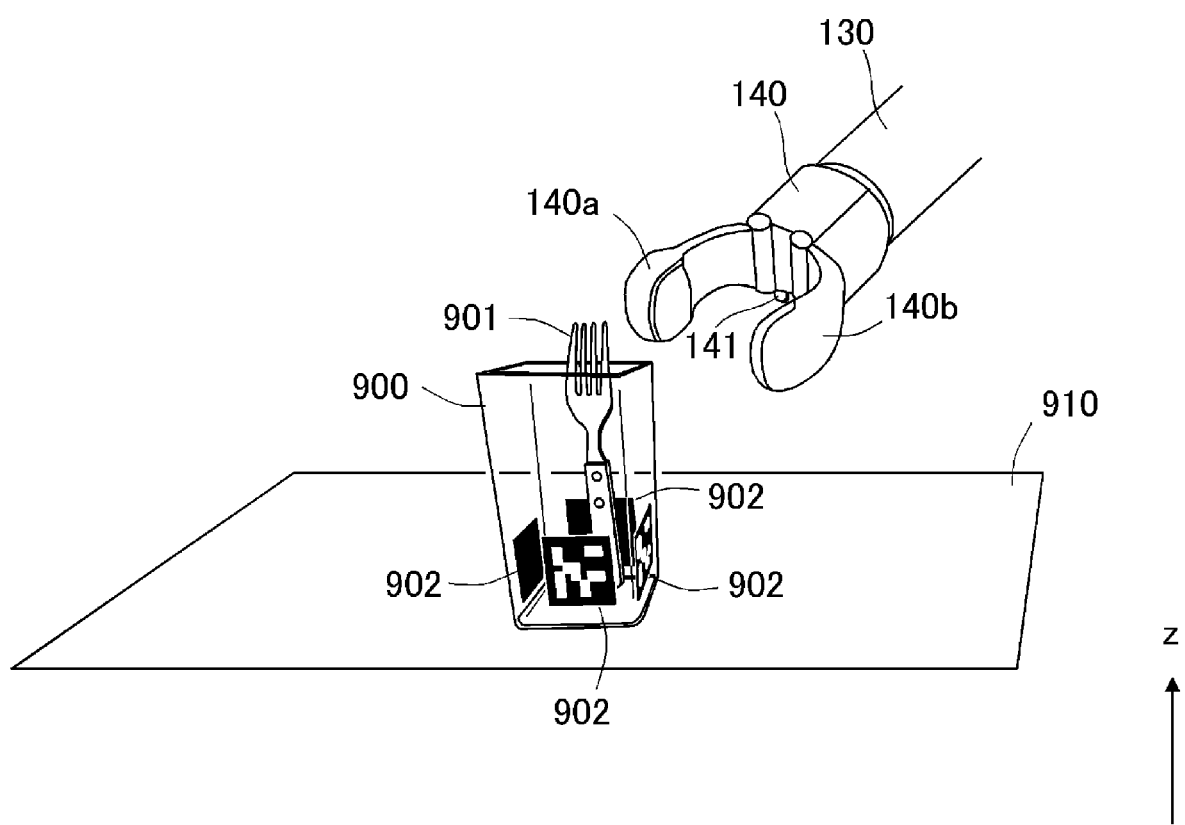
FIG. 3 is a view showing a state in which a hand unit performs a holding operation.

An example of the holding operation will be described. FIG. 3 is a diagram showing a state in which the hand unit 140 performs the holding operation. Here, suppose that the moving robot 100 is instructed by the user to hold a fork 901.

As shown in the drawing, the hand unit 140 according to this embodiment includes the first finger 140a and the second finger 140b that sandwich and hold the holding object by a simple opening and closing operation around a single axis. Each of the first finger 140a and the second finger 140b has a size of about a hand of a human being. Thus, it is structurally difficult to directly hold the fork 901.

To solve this issue, the user or an assistant puts the fork 901 in a transparent container 900 and places the transparent container 900 on a table 910 to prepare a holding environment in advance. As shown in the drawing, the transparent container 900 has a cup shape with an open top, and is made of a translucent material such as polycarbonate or glass. The material may be colored as long as it is translucent. Since the fork 901 is contained in the transparent container 900, the whole shape of the fork 901 can be observed from the outside. That is, the hand camera 141 can observe the fork 901 in a state in which the fork 901 is contained in the transparent container 900. The transparent container 900 may not be a cup shape and instead may be a covered container that contains the entire fork 901. Other elements may be added to the transparent container 900 as long as it has a size and a shape that can be held by at least the first finger 140a and the second finger 140b. Note that the transparent container 900 has such rigidity that it does not deform even when it is sandwiched and held between the first finger 140a and the second finger 140b.

Markers 902 are attached to an outer circumferential surface of the transparent container 900. In this embodiment, a plurality of the markers 902 are attached to the transparent container 900 in a radial direction thereof so that the hand unit 140 may approach from any direction. The marker 902 is a tag in which information including at least one of shape information of the transparent container 900 and holding position information of the transparent container 900 is embedded in a two-dimensional code. In the shape information, a surface shape of the transparent container 900 is represented by a function, or all vertices thereof are expressed by three-dimensional coordinates with the center of the marker 902 as a coordinate center. In the holding position information, a position at which the transparent container 900 is stably held with the first finger 140a and the second finger 140b is expressed as a function representing an area or expressed as a point in three-dimensional coordinates with the center of the marker 902 as a coordinate center.

When the moving robot 100 is instructed to hold the fork 901, the hold controller 201 analyzes the image data obtained from the hand camera 141 and first detects the fork 901. To detect the fork 901, for example, YOLO known as a real-time object detection algorithm can be used.

When the fork 901 is detected, the hold controller 201 searches for the marker 902 proximate to the fork 901 from the image data in which the fork 901 is detected. When the marker 902 cannot be detected from this image data or only a part thereof can be detected from this image data, the hand unit 140 is moved near the detected fork 901, and the image data is obtained again from the hand camera 141 to search for another marker 902 proximate to the fork 901. Specifically, the marker 902 closest to the area where the fork 901 is detected is detected as a proximate marker. When the marker 902 cannot be detected from the image data in which the fork 901 is detected, the image data is obtained while gradually lowering a photographing position in a vertical direction from a position where the fork 901 is detected, and the marker 902 determined that it is the most proximate to the fork 901 from an amount of movement of the hand unit 140 is detected.

When the marker 902 is detected, the hold controller 201 analyzes a marker image in the image data and extracts tag information related to the transparent container 900. When the shape information of the transparent container 900 is extracted, a holding position at which the transparent container 900 can be stably held with the first finger 140a and the second finger 140b is calculated from the shape information, and a holding operation at the holding position is executed. When the holding position information of the transparent container 900 is extracted, the holding operation at the holding position specified by the holding position information is executed. As described above, the hold controller 201 controls the hand unit to hold the fork 901 specified by the user via the transparent container 900.

In this way, when the holding object is contained in the transparent container provided with the markers, and when the information about the transparent container and the information related to the holding are embedded in the markers, the hand unit can indirectly hold the holding object by holding the transparent container even if it cannot directly hold the holding object structurally. Further, the user can directly specify the holding object which he/she wants the moving robot 100 to hold instead of specifying the transparent container to be held at the stage of instructing the moving robot 100 to perform the holding, which eliminates the need for the user to concern about the transparent container which contains the holding object. In other words, it is not necessary for the user to check which transparent container the holding object is contained and to specify the transparent container to be held. In other words, the user does not need to perform an operation to associate the container with the holding object in advance and instead the user only needs to put the holding object in any transparent container provided with the markers and then place the transparent container on a table or a shelf.

Moreover, when the holding object is contained in the transparent container, it is difficult to accurately acquire the shape of the transparent container from the image of the image data. However, since the hold controller 201 can obtain information necessary for the holding from the tag information of the markers, the user does not need to accurately acquire the shape of the transparent container. In other words, since the hold controller 201 can acquire that the holding object is contained in the transparent container when it can detect the marker, it does not control the hand unit to forcedly hold the holding object directly.

Further, the tag information for the hand unit to stably hold the transparent container can be described in various ways. When the tag information includes the shape information and the holding position information of the transparent container, the hold controller 201 can easily determine how to hold the transparent container, which enables the holding operation to be quickly and efficiently executed. Further, when the tag information is embedded in the marker, the shape of the transparent container and the holding position can be defined with reference to the position of the marker attached to the transparent container. Then, it is not necessary to embed much information in the tag information, and thus the tag with a simple two-dimensional code can be achieved.

Figure 4:
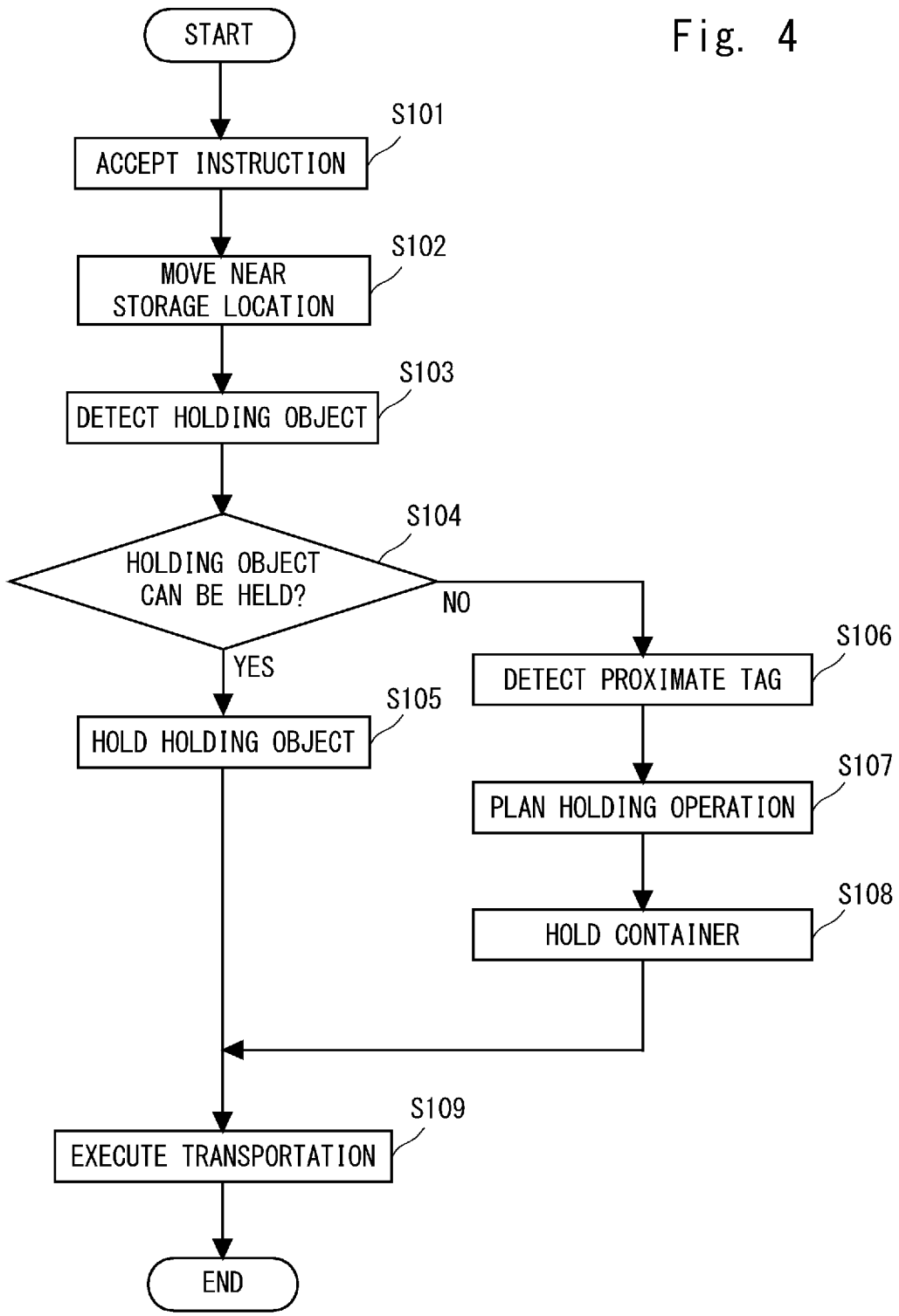
FIG. 4 is a flowchart for explaining a series of processes of the moving robot.

Next, a series of holding and transporting processing including the holding operation described with reference to FIG. 3 will be described. FIG. 4 is a flowchart for explaining the series of holding and transporting processing of the moving robot 100.

In Step S101, the controller 200 accepts, from the user via the user IF 240, the instruction indicating the transporting object to be retrieved. The controller 200 reads out the environment map from the memory 250, identifies a storage location (e.g., a shelf or a table) where the indicated transporting object is stored, and plans a movement path to the storage location. Then, in Step S102, the moving robot 100 moves autonomously along the planned movement path and stops when it reaches near the storage location.

In Step S103, the hold controller 201 drives the arm unit 130 and the hand unit 140 to analyze the image data sequentially obtained from the hand camera 141, and searches for the holding object which is the indicated transporting object. When the holding object is detected, the process proceeds to Step S104.

In Step S104, the hold controller 201 determines whether the hand unit 140 can directly hold the holding object. In the example described with reference to FIG. 3, it is assumed that the holding object is contained in the transparent container. However, the transporting object indicated by the user (i.e., the holding object) is not limited to things that cannot be directly held by the hand unit 140. Things that can be directly held are stored in the storage location without being stored in a container. Thus, the hold controller 201 reads, from the memory 250, the lookup table in which groups of the holding objects contained and stored in the containers are listed in advance, and checks whether the holding object indicated by the user is included in the lookup table. When the holding object indicated by the user is not included in the lookup table, it is determined that the hand unit 140 can directly hold it, and the process proceeds to Step S105. When the holding object indicated by the user is included in the lookup table, it is determined that the hand unit 140 cannot hold it directly, and the process proceeds to Step S106.

When the process proceeds to Step S105, the hold controller 201 executes the holding operation for holding the holding object detected in Step S103. After the holding object is held, the process proceeds to Step S109.

When the process proceeds to Step S106, the hold controller 201 searches for the marker 902 which is the tag proximate to the holding object from the image data in which the holding object is detected. When the marker 902 cannot be detected from this image data or only a part thereof can be detected from this image data, the hand unit 140 is moved near the detected holding object, and the image data is obtained again from the hand camera 141 to search for the marker 902 proximate to the holding object. When the marker 902 can be detected, the hold controller 201 analyzes the marker image in the image data and extracts the tag information related to the transparent container 900.

The process proceeds to Step S107 where the hold controller 201 sets the holding position on the transparent container 900 from the detected tag information and plans the operations of the arm unit 130 and the hand unit 140 so that the transparent container 900 can be held at the holding position. Then, in Step S108, the hold controller 201 drives the arm unit 130 and the hand unit 140 to execute the holding operation at the holding position. After the transparent container 900 containing the holding object is held in this manner, the process proceeds to Step S109.

In Step S109, the controller 200 controls the moving robot 100 to autonomously move to the destination, which is a transport destination, and execute transporting while controlling the moving robot 100 to maintain a holding posture for holding the holding object directly or indirectly. When the moving robot 100 reaches the destination, a series of processing is ended.

Figure 5:
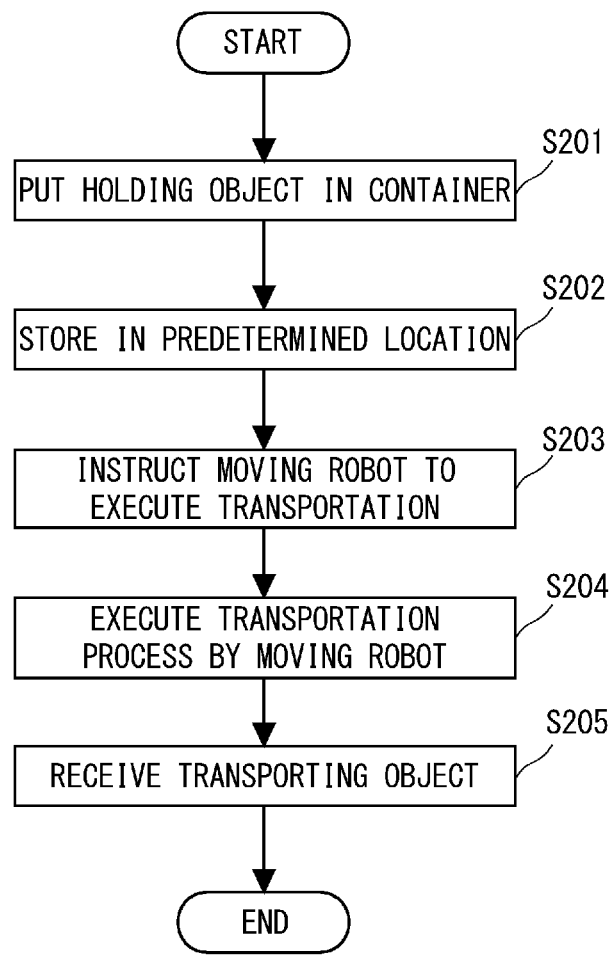
FIG. 5 is a flowchart describing an entire procedure for achieving transportation of a transporting object.

FIG. 5 is a flowchart for explaining the entire procedure for achieving the transportation of the transporting object. FIG. 4 shows a processing flow executed by the controller 200 of the moving robot 100, whereas FIG. 5 is a flowchart of a transportation method including work of the user or assistant to achieve the transportation of the object using the moving robot 100.

In Step S201, the user or assistant puts an object that can be held in any transparent container 900 to which markers are attached. In Step S202, the user or assistant places the object on a table or a shelf at a predetermined location to store it. The predetermined location is a location described as a storage location of the object in the environmental map stored in the memory 250 or a place newly described in the environmental map as the storage location of the object.

When the user wants the moving robot 100 to transport an object, the user gives an instruction about the transporting object to the moving robot 100 in Step S203. This corresponds to Step S101 in FIG. 4 on the side of the moving robot 100. Then, in Step S204, the moving robot 100 executes the indicated transporting process. This corresponds to Steps S102 to Step S109 on the side of the moving robot 100.

In Step S205, the user receives the transporting object from the moving robot 100, and a series of transporting methods is completed. When the user wants the moving robot 100 to transport a plurality of transporting objects, Steps S203 to S205 may be repeated. Further, Steps S201 and S202 may be performed on the transporting object, the use of which has been completed after being transported so that it can be returned to its original storage location.

Figure 6:
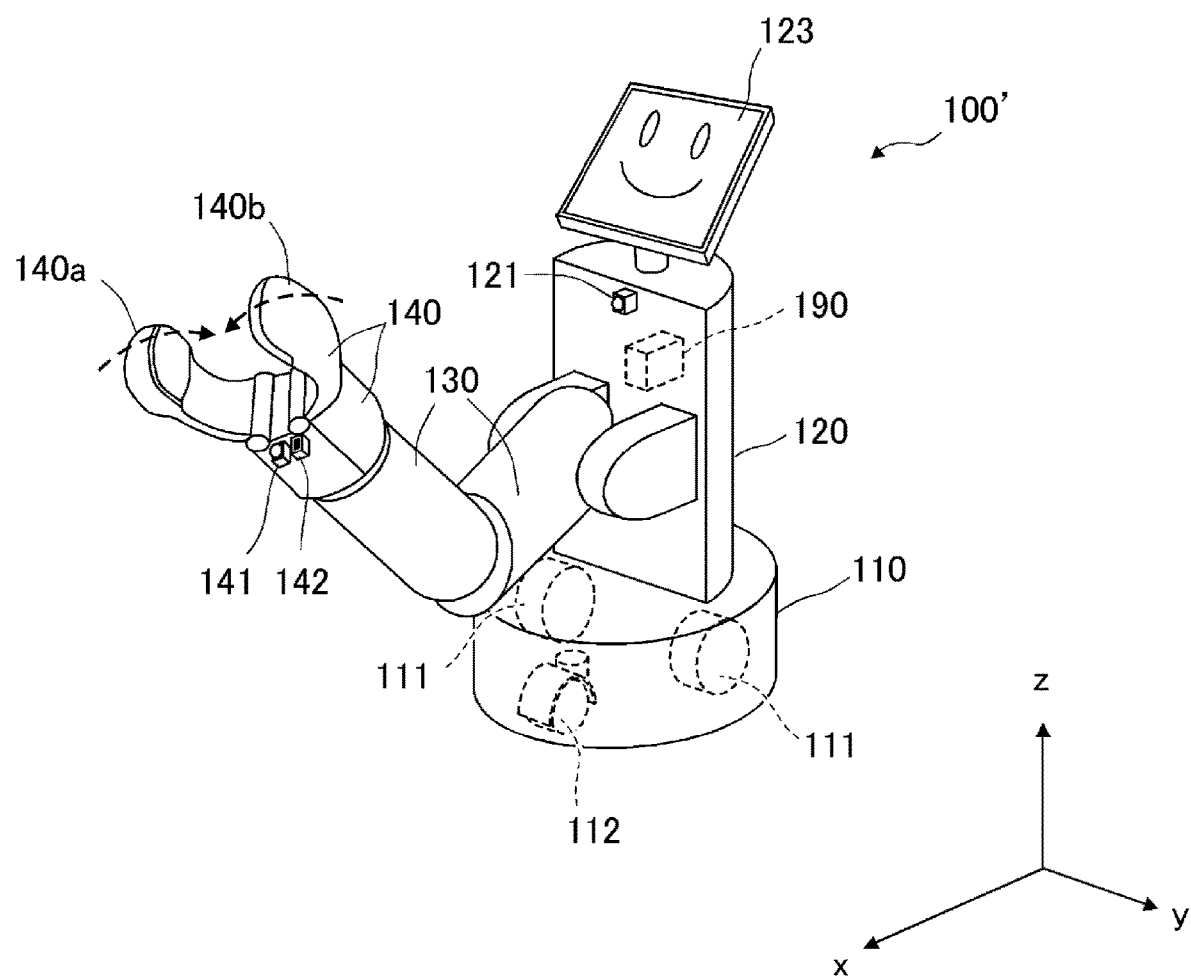
FIG. 6 is an external perspective view of a moving robot according to a first modified example.

Next, several modified examples will be described. FIG. 6 is an external perspective view of a moving robot 100' according to a first modified example. The moving robot 100' further includes a tag reader 142 in addition to the configuration of the moving robot 100. The tag reader 142 is disposed, for example, adjacent to the hand camera 141 as shown in the drawing. The tag reader 142 is an apparatus that irradiates an IC tag with radio waves and reads information recorded on the IC tag.

Figure 7:
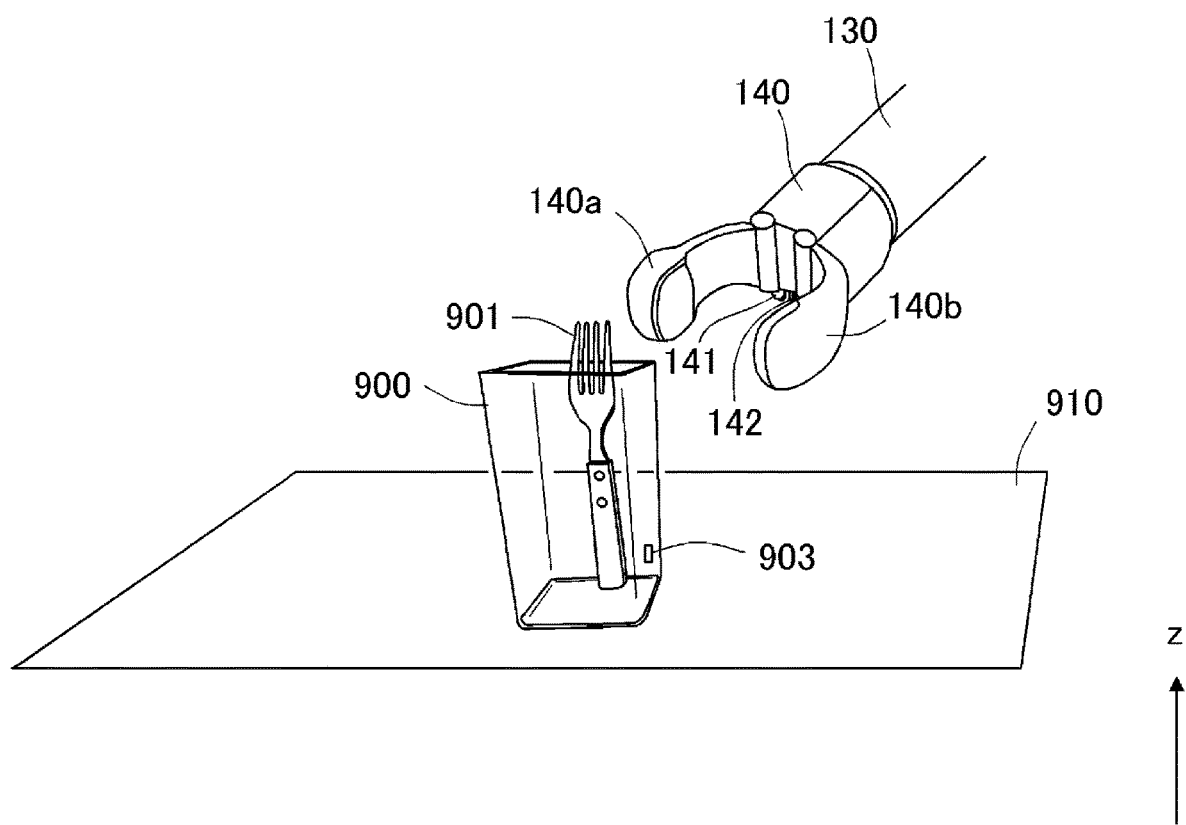
FIG. 7 is a view showing a state in which a hand unit according to a first modified example performs a holding operation.

FIG. 7 is a view showing a state in which the hand unit 140 of the moving robot 100' according to the first modified example performs the holding operation. Unlike the transparent container 900 to which the markers 902 shown in FIG. 3 are attached, an IC tag 903 is attached to the transparent container 900 according to this modified example. At least one of the shape information of the transparent container 900 and the holding position information of the transparent container 900 is recorded on the IC tag 903. Other conditions and settings are the same as those in the example of FIG. 3.

When the hold controller 201 analyzes the image data obtained from the hand camera 141 and detects the fork 901, it drives the tag reader 142 to detect the IC tag 903 proximate to the fork 901, and reads the information of the IC tag 903. Then, the holding position of the transparent container 900 is set based on this information, and the holding operation is executed. Note that the position of the IC tag 903 is calculated, for example, by changing the position of the tag reader 142 to read the IC tag 903 and using a difference in radio wave intensity at different positions and a difference in reading positions.

In the example of FIG. 3, the two-dimensional code markers 902 are used as the tags, and thus the hand camera 141 can be provided with two functions as the first detection unit that detects the indicated holding object and the second detection unit that detects the tag proximate to the holding object. However, in the example of FIG. 3, it is necessary to attach the plurality of markers 902 each having an area enough to print a two-dimensional code to the transparent container 900. In this modified example, the hand camera 141 is provided with a function as the first detection unit that detects the indicated holding object, and the tag reader 142 is provided with a function as the second detection unit that detects the tag proximate to the holding object. That is, although it is necessary to implement each of the hand camera 141 and the tag reader 142 by a separate piece of hardware, the IC tag 903 is smaller than the marker 902, and only one IC tag 903 needs to be attached to the transparent container 900. Specifically, in this modified example, it is less likely to impair the design property of the transparent container 900, and further, attaching the IC tag 903 is easy.

Figure 8:
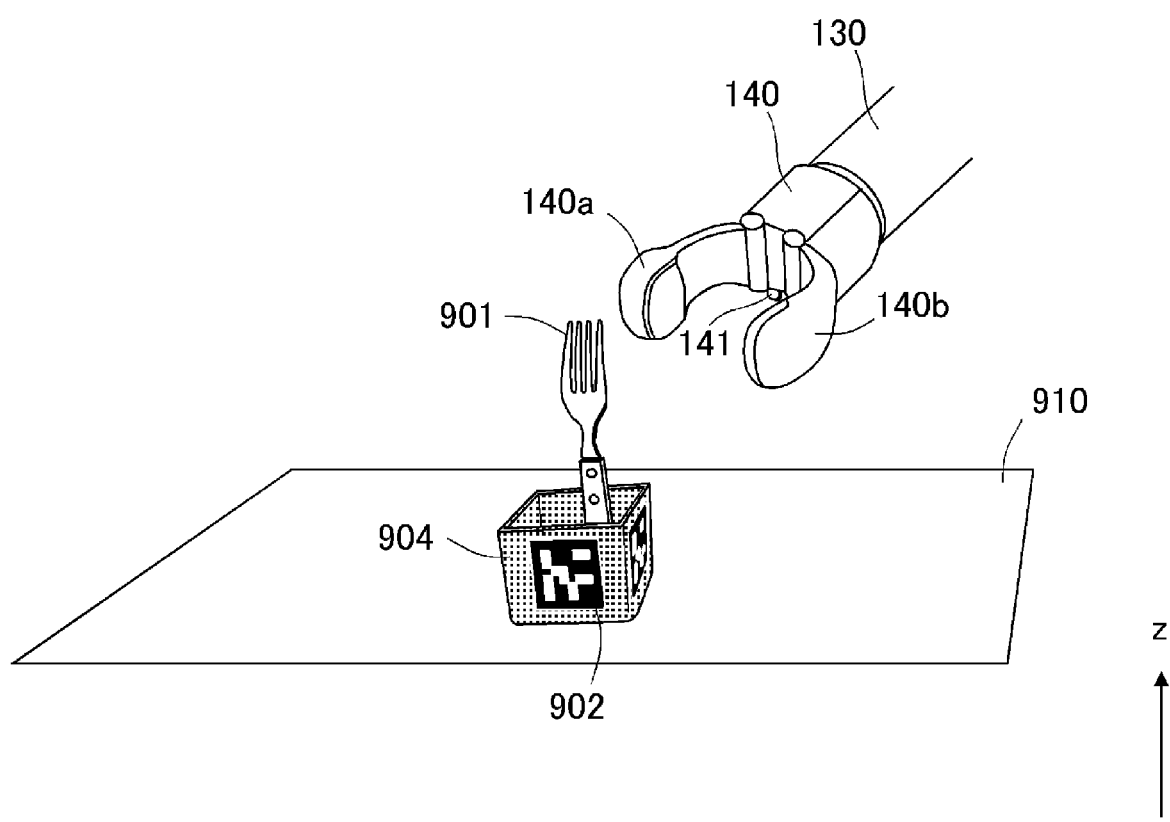
FIG. 8 is a view showing a state in which a hand unit according to a second modified example performs a holding operation.

FIG. 8 is a diagram showing a state in which the hand unit 140 according to the second modified example performs the holding operation. In the examples of FIGS. 3 and 7, the fork 901 is contained in the transparent container 900. However, in this modified example, the fork 901 is contained in a relatively shallow opaque container 904. Other conditions and settings are the same as those in the example of FIG. 3.

In the above examples, the transparent container 900 is used because the holding object contained therein can be satisfactorily detected. That is, the transparent container enables the hand camera 141 to photograph the entire holding object, which contributes to improving the detection accuracy of the holding object. However, any container may be used as long as the holding object contained therein can be detected. Thus, in this modified example, the opaque container 904, which is a shallow and opaque container, is used. In the opaque container 904, about a half of the fork 901 to be contained is exposed to the outside. Like in this case, the hold controller 201 can recognize the fork 901 if about a half of the contained fork 901 is exposed to the outside.

Like the transparent container 900, a plurality of markers 902 are attached to an outer periphery of the opaque container 904. After the fork 901 is detected, the hold controller 201 detects the marker 902, sets the holding position of the opaque container 904 based on the tag information read from the marker 902, and executes the holding operation.

The level of the exposure of the contained holding object from the opaque container 904 varies depending on the shape of the holding object, the way the holding object is contained in the opaque container 904, etc. For example, it is easy to detect the fork 901 by image analysis if a characteristic comb-shaped leading end part of the fork 901 is exposed, and thus most of the handle part of the fork 901 may be hidden in the opaque container 904. Further, in this modified example, the IC tag 903 may be attached instead of attaching the marker 902. In such a case, it is necessary to include the tag reader 142 as the hand unit 140.

Although this embodiment including the modified examples has been described so far, the holding object contained in the transparent container 900 or the opaque container 904 is not limited to the single fork 901. A plurality of forks may be contained, or a spoon(s) may be contained. When the user specifies a fork as the holding object, and when it is allowed that the spoon together with the fork are held, both the fork and the spoon may be contained. It is obvious that the holding object is not limited to small objects such as a fork and a spoon, and instead a relatively large object which is difficult to be held may be contained in a container and held. On the contrary, a very small object with respect to the holding part is also suitable for being contained in a container and held. Furthermore, when the user wants the moving robot 100 to hold an object present in a liquid such as living fish in sea water, the object may be contained together with the liquid in the transparent container 900, so that the object can be reliably held via the transparent container 900. Additionally, an easily deformable object such as a food item is also suitable for being contained in a container and held.

In the above-described embodiment, the first finger 140a and the second finger 140b that sandwich and hold the holding object by an opening and closing operation around a single axis are described as examples of the holding part. However, the holding part may have a more complicated structure. For example, the holding part may include a plurality of claws or may be a holding part with multi-joint fingers like a human hand. It may be determined whether to contain the holding object in the container to indirectly hold it according to the performance of the holding part.

In the above-described embodiment, the holding object is detected using the image data output from the hand camera 141. However, the holding object may be detected using the image data output from the environment camera 121 disposed in the main body part 120. In this case, the environment camera 121 is provided with the function of the first detection unit. Alternatively, the environment camera 121 may photograph a wide range, an area of interest may be narrowed down, and then the hand camera 141 may be used. In this case, the environment camera 121 and the hand camera 141 are provided with the function of the first detection unit.

Further, in the above-described embodiment, although examples of the two-dimensional code markers 902 and the IC tag 903 have been described as the tags, the tags that can be employed are not limited to them. Furthermore, when the tag is used, the tag is not limited to being attached to the container and instead may be, for example, embedded in a material or directly printed.

In the above-described embodiment, an example in which the moving robot 100 includes the holding apparatus has been explained. However, the holding apparatus may be an independent apparatus not including a moving mechanism or the like. In this case, the control unit necessary for controlling the holding apparatus is provided in the holding apparatus.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A holding apparatus comprising:
a controller configured to receive an instruction indicating a holding object;
a hand camera configured to detect an indicated holding object;
a tag reader configured detect a tag proximate to the holding object when the indicated holding object is detected; and
a holding part configured to hold a container being configured to hold the indicated holding object, the container being provided with the tag based on tag information of the tag detected by the hand camera, wherein:
the holding part includes a first finger and a second finger, the first finger and the second finger both being configured to open and close about a same axis.

2. The holding apparatus according to claim 1, wherein the tag information includes at least one of shape information of the container and holding position information of the container.

3. The holding apparatus according to claim 1, wherein the tag is a marker of a two-dimensional code, and the holding part holds the container based on the tag information and a position of the marker.

4. The holding apparatus according to claim 1, wherein when the indicated holding object is not included in a predetermined holding object group, the holding part holds the indicated holding object without detecting the tag by the tag reader.

5. A container provided with the tag and formed of a translucent material to be held by the holding apparatus according to claim 1.

6. A non-transitory computer readable medium storing an object holding program causing a computer to execute:
receiving an instruction indicating a holding object;
controlling a first detection unit to detect the indicated holding object;
controlling a second detection unit to detect a tag proximate to the indicated holding object when the indicated holding object is detected; and
controlling a holding part to hold a container provided with the tag based on tag information of the tag detected in the controlling of the second detection unit, the container being configured to hold the indicated holding object, the holding part including a first finger and a second finger, the first finger and the second finger both being configured to open and close about a same axis.

7. A target holding method comprising:
sending instructions indicating a holding object;
putting the indicated holding object in a container provided with a tag and formed of a translucent material, the container being configured to hold the indicated holding object; and
controlling a holding apparatus to hold the container containing the holding object indicated in the indicating, wherein the controlling comprises:
controlling a first detection unit to detect the holding object indicated in the indicating;
controlling a second detection unit to detect the tag when the holding object is detected in the controlling of the first detection unit; and
controlling a holding part to hold a container provided with the tag based on tag information of the tag detected in the controlling of the second detection unit, the holding part including a first finger and a second finger, the first finger and the second finger both being configured to open and close about a same axis.

* * * * *